(12) United States Patent
Misawa

(10) Patent No.: US 6,700,607 B1
(45) Date of Patent: Mar. 2, 2004

(54) IMAGE SENSOR DRIVING METHOD AND ELECTRONIC CAMERA

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/325,391

(22) Filed: Jun. 4, 1999

(30) Foreign Application Priority Data

Jun. 5, 1998 (JP) .......................................... 10-157484

(51) Int. Cl.$^7$ ..................... H04N 5/235; H04N 5/335
(52) U.S. Cl. ..................... 348/230.1; 348/311
(58) Field of Search .................. 348/311, 312, 348/315, 317, 318, 319, 320, 321, 322, 323, 324, 294, 222.1, 333.11, 230.1

(56) References Cited

U.S. PATENT DOCUMENTS

| | | | | |
|---|---|---|---|---|
| 4,740,828 A | * | 4/1988 | Kinoshita | 348/222.1 |
| 5,668,597 A | * | 9/1997 | Parulski et al. | 348/315 |
| 6,122,007 A | * | 9/2000 | Ishibashi | 348/222.1 |
| 6,130,420 A | * | 10/2000 | Tanaka et al. | 348/302 |
| 6,181,375 B1 | * | 1/2001 | Mitsui et al. | 348/320 |
| 6,292,218 B1 | * | 9/2001 | Parulski et al. | 348/333.11 |
| 6,340,989 B1 | * | 1/2002 | Oda | 348/333.11 |
| 6,342,921 B1 | * | 1/2002 | Yamaguchi et al. | 348/294 |
| 6,512,541 B2 | * | 1/2003 | Dunton et al. | 348/230.1 |
| 6,529,236 B1 | * | 3/2003 | Watanabe | 348/317 |

* cited by examiner

Primary Examiner—Aung Moe
(74) Attorney, Agent, or Firm—Birch, Stewart, Kolasch & Birch, LLP

(57) ABSTRACT

In an electronic camera, captured images are refreshed at a high refresh rate in a normal image-capturing mode and at AE/AF, and an image with many pixels is captured in a macro image-capturing mode and a mode for outputting an image signal to an external monitor. In the normal image-capturing mode and at the AE/AF, a solid-state imaging device is driven by reading signals from ¼ or ⅛ of the photoelectric elements in a vertical direction. In this case, a slightly rough image is obtained at a high refresh rate and with a small amount of electricity. In the macro image-capturing mode and the mode for outputting the image signal to the external equipment, the solid-state imaging device is driven by reading signals from ½ of the photoelectric elements or all the photoelectric elements automatically. Consequently, an image with many pixels is obtained. A focus can be precisely confirmed in the macro image-capturing mode, and a precise image can be displayed on the external monitor with a large screen.

18 Claims, 10 Drawing Sheets

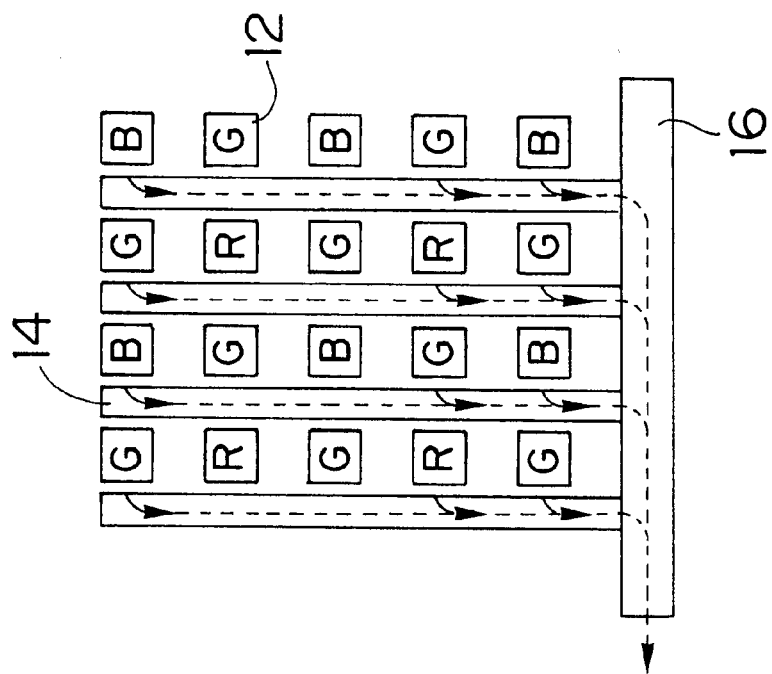
F I G. 2 (b)
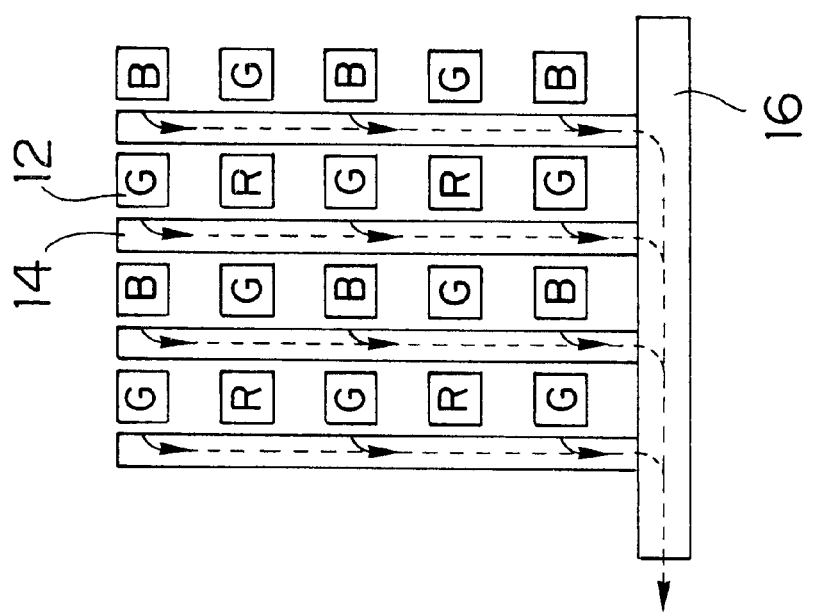
F I G. 2 (a)

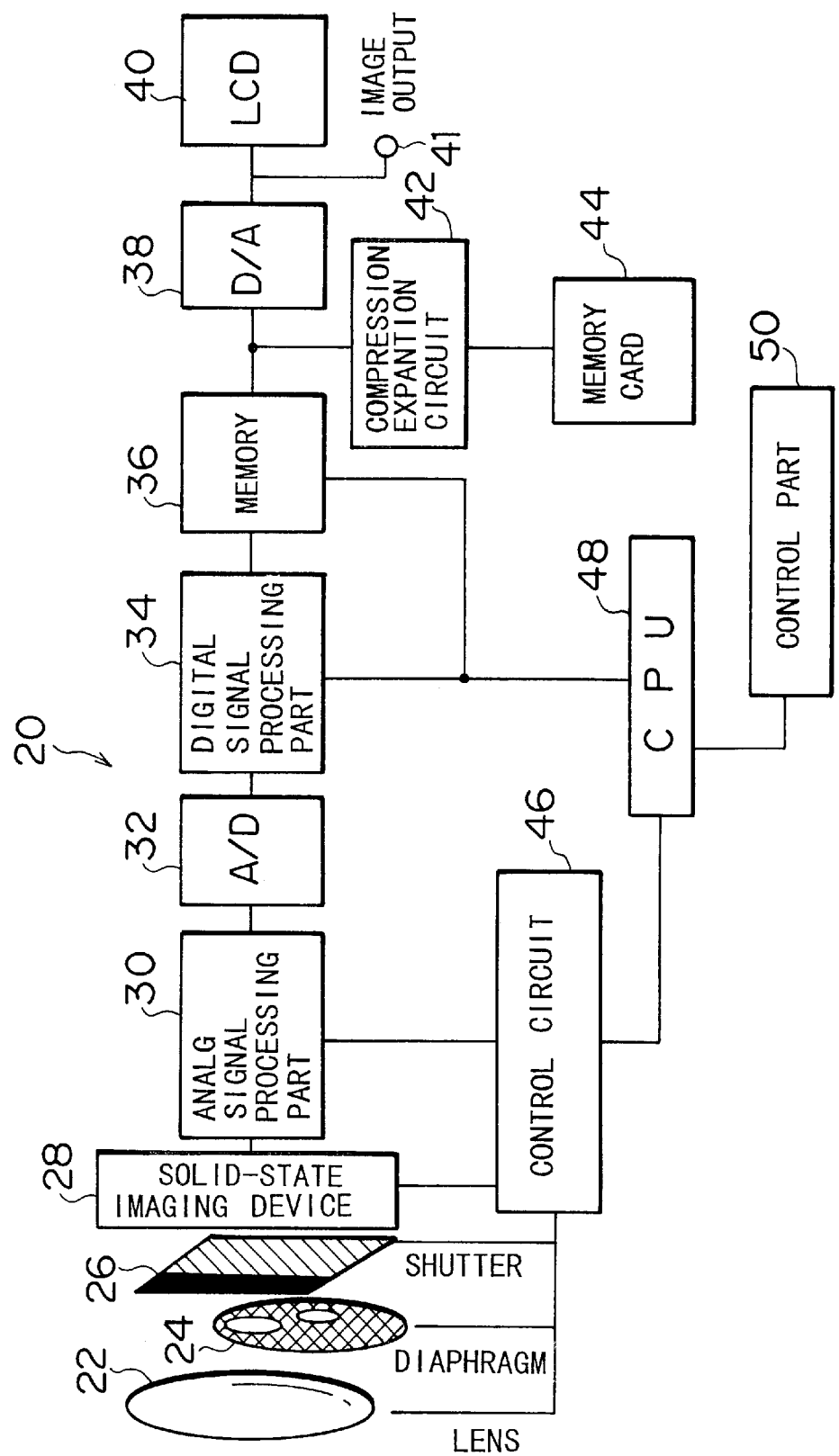

F I G. 7
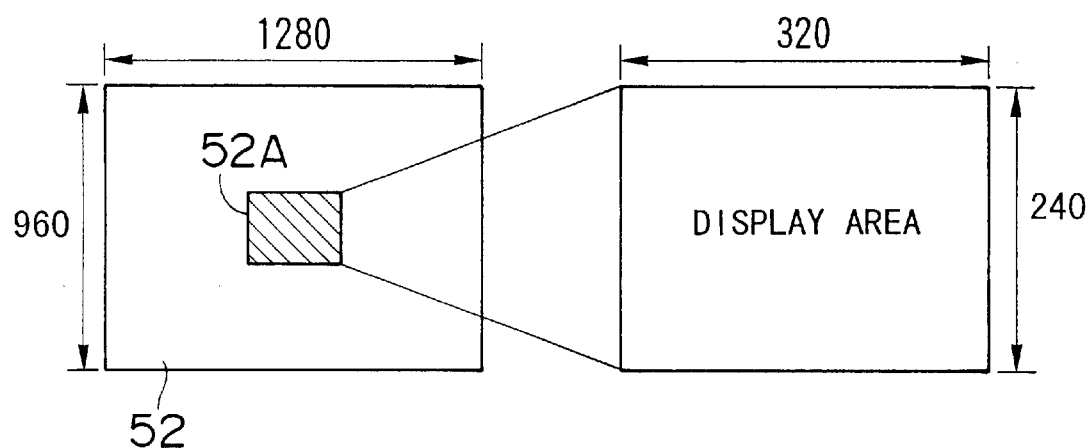

IMAGE SENSOR DRIVING METHOD AND ELECTRONIC CAMERA

BACKGROUND OF THE INVENTION

1. Field of the Invention

The present invention relates generally to an image sensor driving method and an electronic camera, and more particularly to an image sensor driving method suitable for a digital camera, etc. loaded with an image sensor with more than one million pixels, and an electronic camera using this image sensor driving method.

2. Description of Related Art

An image sensor of a conventional digital camera has a relatively small number of pixels such as 640×480. Then, the image sensor can be always driven by the same driving method, in which signal electric charges are read from all the pixels of the image sensor, during performing an automatic focusing (AF) and an automatic exposure control (AE) and at any mode such as a normal image-capturing mode and a macro image-capturing mode. This is called a normal driving.

A digital camera has been developed, which has many pixels to achieve a high quality image. With the increase in the number of pixels, the signals cannot be processed on time at the AF and AE in the normal driving method. To address this problem, there is proposed a method of driving the image sensor by reading the signal electric charges from ½ or ¼ of the pixels at the AF and the AE. More specifically, the signal electric charges are read from every second or every fourth of pixels arranged vertically.

A refresh rate can be increased in the above-mentioned driving method in which the number of the pixels to be read is reduced in the vertical direction. The image data, however, can be missing in the vertical direction. Thus, it is impossible to accurately confirm whether an image is focused or not in the macro image-capturing mode. Moreover, if the image data are outputted to an outside monitor, a rough image is displayed on the monitor.

SUMMARY OF THE INVENTION

In view of the foregoing, it is an object of the present invention to provide an image sensor driving method in which images are refreshed at a high refresh rate in a normal image-capturing mode and at AE/AF, and an image with many pixels is captured in a macro image-capturing mode and when image signals are outputted to an external monitor; and an electronic camera employing such a method.

To achieve the above-mentioned object, the present invention is directed to an image sensor driving method for reading signals from photoelectric elements in an image sensor built in an image-capturing apparatus, the method comprising the steps of: reading signals from a first proportion of the photoelectric elements in the image sensor in a first mode; and reading signals from a second proportion of the photoelectric elements in the image sensor in a second mode, the second proportion being higher than the first proportion and up to all. For example, the first mode is a normal image-capturing mode; and the second mode is one of a macro image-capturing mode and a mode for outputting an image signal representing an image captured by the image sensor to external equipment.

According to the present invention, the image sensor is driven by reading the signals from the first proportion of the photoelectric elements in the normal image-capturing mode. In this case, the images can be captured at a high refresh rate, and the captured images are rough but satisfactory for confirmation of a picture composition as far as the images are displayed on a compact monitor, etc. attached to the image-capturing apparatus.

In the macro image-capturing (close range image-capturing) mode, the image sensor is driven by reading the signals from more photoelectric elements (the second proportion of the photoelectric elements) up to all the photoelectric elements. This captures the data of more pixels than in the normal image-capturing mode to thereby enable the accurate confirmation of the focus. Whether the image-capturing apparatus has the macro image-capturing mode or not, the number of the photoelectric elements to be read is increased to the second proportion up to all the photoelectric elements even in the normal image-capturing mode if the image-capturing apparatus is connected to the external equipment. Consequently, if the captured image is outputted to the external equipment such as a large-screen monitor, a precise image can be displayed on the monitor.

Preferably, in the image sensor driving method, a refresh rate of images captured by the image sensor in the first mode is equal to a frame frequency in a preset color television signal format. The preset color television signal format may be one of NTSC, PAL and SECAM.

This eliminates the necessity of storing the image captured by the image sensor into a frame memory. It is therefore possible to shut off the power of the frame memory, etc., and this does not waste the electricity.

To achieve the above-mentioned object, the present invention is directed to an electronic camera comprising: an image sensor for capturing an image, the image sensor including a plurality of photoelectric elements; an image display for displaying the image captured by the image sensor; a mode switcher for switching modes between a first mode and a second mode; and an image sensor drive controller for reading signals from a first proportion of the photoelectric elements in the image sensor in the first mode, and reading signals from a second proportion of the photoelectric elements in the image sensor in the second mode, the second proportion being higher than the first proportion and up to all. For example, the first mode is a normal image-capturing mode; and the second mode is one of a macro image-capturing mode and a mode for outputting an image signal representing an image captured by the image sensor to external equipment.

According to the present invention, the image sensor is driven by reading the signals from the first proportion of the photoelectric elements in the normal image-capturing mode. When the mode switcher sets the macro image-capturing mode, the image sensor is driven by reading the signals from more photoelectric elements or all the photoelectric elements automatically. This makes it possible to capture the images with many pixels in the macro image-capturing mode, so that the focus can be confirmed accurately.

Preferably, the electronic camera further comprises: an output interface for outputting an image signal representing the image captured by the image sensor to external equipment; and wherein the image sensor drive controller reads signals from a third proportion of the photoelectric elements in the image sensor in a mode for outputting the image signal to the external equipment through the output interface, the third proportion being higher than the first proportion and up to all. The third proportion may be equal to the second proportion.

When the electronic camera is connected to the external equipment, the number of the photoelectric elements to be read is increased or all the photoelectric elements are read even in the normal image-capturing mode. For this reason, the high-quality image can be displayed on the external image display apparatus. This is particularly advantageous when an external monitor with a large screen is used.

Preferably, the electronic camera further comprises: a high-quality image confirmation mode setting device for setting a high-quality image confirmation mode in response to an operation from outside; and wherein the image sensor drive controller reads signals from a third proportion of the photoelectric elements in the image sensor in the high-quality image confirmation mode, the third proportion being higher than the first proportion and up to all. The third proportion may be equal to the second proportion.

The electronic camera can be set to the high-quality image confirmation mode if the user operates a predetermined control part as the need arises. If the user selects the high-quality image confirmation mode in the normal image-capturing mode, the number of the photoelectric elements to be read is increased or the signals are read from all the photoelectric elements unconditionally. Therefore, the user can freely select an image with many pixels at a low refresh rate or a rough image at a high refresh rate.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 2(a) and 2(b) are explanation drawings showing examples wherein the image sensor is driven by reading signal electric charges from ½ of photoelectric elements;

FIG. 5 is a block diagram showing the structure of a digital camera according to a preferred embodiment of the present invention;

FIG. 7 is an explanation drawing showing a method of driving the image sensor and displaying an image on a monitor in a macro image-capturing mode;

DETAILED DESCRIPTION OF THE PREFERRED EMBODIMENT

This invention will be described in further detail by way of example with reference to the accompanying drawings.

Figure 1:
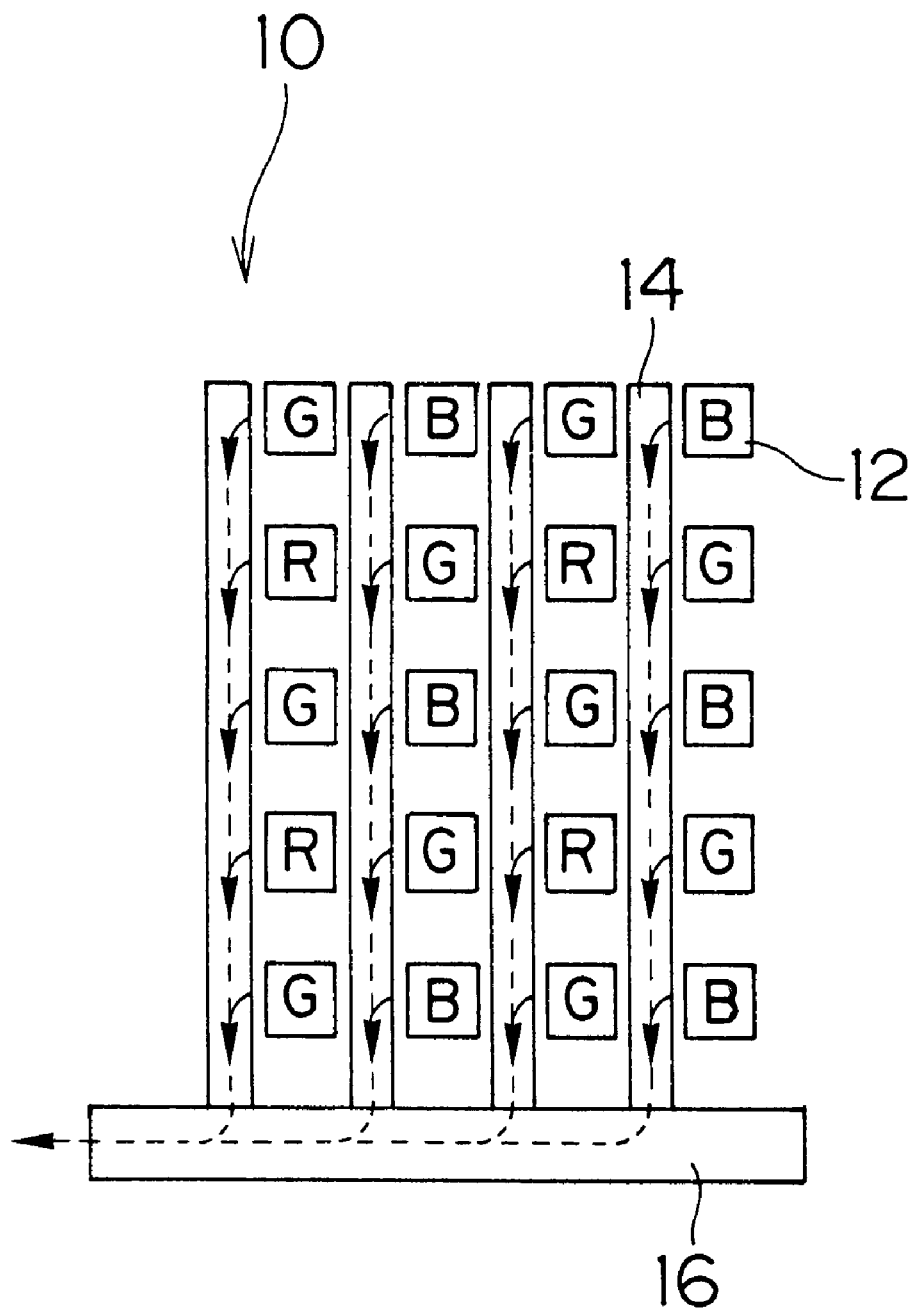
FIG. 1 is a conceptional drawing showing an example of a normal driving of an image sensor.

A description will be given of a driving of an image sensor by reducing the number of photoelectric elements to be read. FIG. 1 shows an example of an image sensor or a charge-coupled device (CCD) 10. The CCD 10 comprises photoelectric elements 12, vertical transfer routes 14 and a horizontal transfer route 16. Only a small number of the photoelectric elements 12 are shown in FIG. 1, but actually the CCD 10 has pixels of as 1280×1024 or 1280×960, more than that of the super video graphics array (SVGA). The photoelectric elements 12 are arranged two-dimensionally, and the photoelectric elements 12 and the vertical transfer routes 14 are vertically lined up alternately. A color filter in red (R), green (G) or blue (B) is provided at the front of each of the photoelectric elements 12. The photoelectric elements 12 are connected to the vertical transfer routes 14 through read gates (not shown). The ends (the bottom ends) of the vertical transfer routes 14 are connected to the horizontal transfer route 16, and the end (the left end in FIG. 1) of the horizontal transfer route 16 is connected to an output part (not shown). The arrangement of the photoelectric elements 12 in FIG. 1 is called a Bayer arrangement. The photoelectric elements 12 are not necessarily arranged in this arrangement.

The read gates are controlled by read gate pulses, which are applied from a CCD drive circuit (an image sensor drive circuit). In response to the read gate pulses, the signal electric charges accumulated in the photoelectric elements 12 are transferred to the vertical transfer routes 14. Unnecessary electric charges that are accumulated before a shutter releasing operation are discharged onto a CCD substrate by a shutter gate pulse preceding the read gate pulses.

The vertical transfer routes 14 vertically transfer the signal electric charges, which are read from the photoelectric elements 12, downward in FIG. 1 by vertical transfer pulses, which are applied from the CCD drive circuit. The signal electric charges that reach the ends of the vertical transfer routes 14 are sequentially transferred to the horizontal transfer route 16 every one horizontal fly-back period.

The horizontal transfer route 16 transfers the signal electric charges to the output part (not shown) by horizontal transfer pulses, which are applied from the CCD drive circuit. The output part measures the inputted signal electric charges, and outputs them as a signal voltage to an output terminal. Thus, the signals are read from all the photoelectric elements 12 in the normal driving, and the signals are outputted as dot-sequential signal lines.

A description will now be given of an example in which the image sensor is driven by reading the signals from ½ of the photoelectric elements 12 with reference to FIGS. 2(a) and 2(b).

In FIG. 2(a), the signals are read from ½ of the photoelectric elements 12 in every other horizontal line. If lines including B (blue) (the first, third and fifth horizontal lines in FIG. 2(a)) are read as shown in FIG. 2(a), only G (green) and B color information can be read in one driving operation, whereas R (red) color information can not be read. Hence, the horizontal lines including R (the second and fourth lines in FIG. 2(a)) are read in the next driving operation, so that R, G and B color information can be read in the two driving operations. In the case of the Bayer arrangement, the image sensor is thus driven by reading the signals from ½ of the photoelectric elements 12 twice. In other arrangements (e.g., a G-stripe arrangement in which every one horizontal line includes R, G and B color information), it is possible to read the R, G and B color information in one driving operation in which the signals are read from ½ of the photoelectric elements 12. An interlace transfer driving type CCD, etc. read the signals in the above-described method.

In a method shown in FIG. 2(b), two horizontal lines are read and then the next two horizontal lines are skipped. This has such an advantage that all color information can be read in one driving even in the Bayer arrangement.

Figure 3:
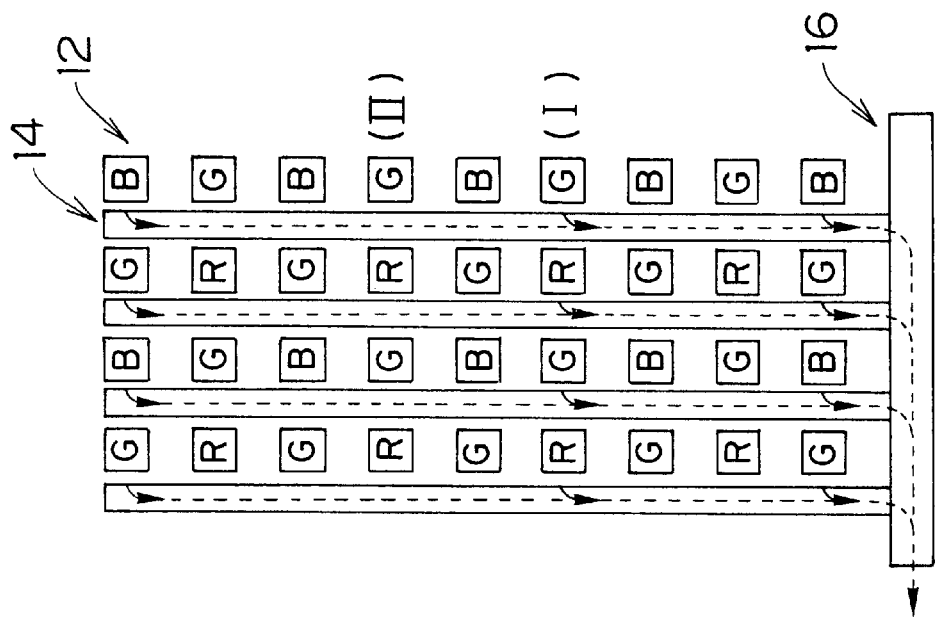
FIGS. 3(a) and 3(b) are explanation drawings showing examples wherein the image sensor is driven by reading the signal electric charges from ¼ of the photoelectric elements.
Figure 3:
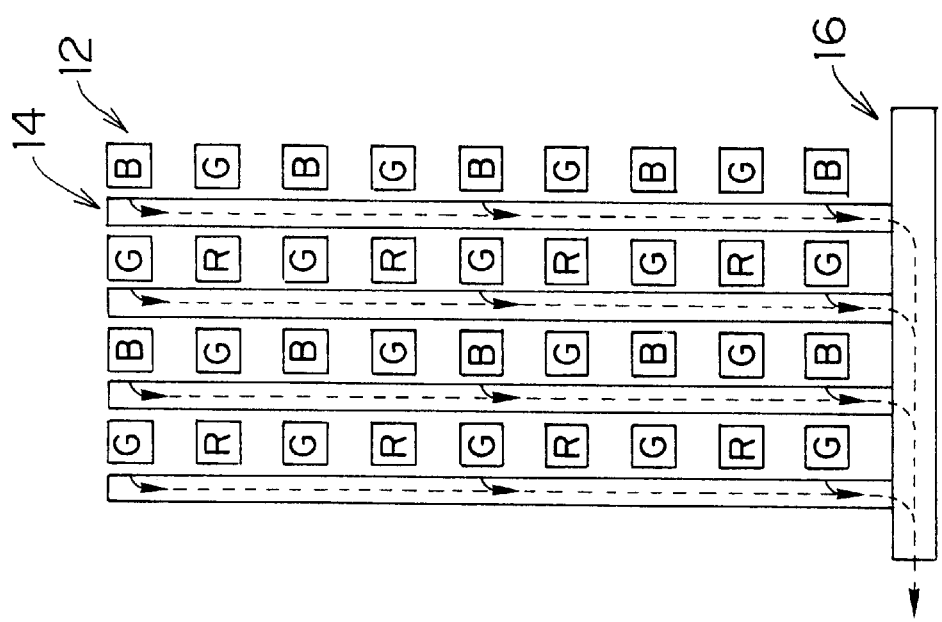

A description will now be given of an example in which the image sensor is driven by reading the signals from ¼ of the photoelectric elements 12 with reference to FIGS. 3(a) and 3(b).

FIG. 3(a) shows an example of a uniform reading, in which the signals are read from ¼ of the photoelectric elements 12 at regular intervals in the vertical direction. One horizontal line is read, and then three horizontal lines are skipped. In the next driving operation, one line is shifted so as to read a line including R (an R line). Thus, all color information can be read in the two driving operations.

As shown in FIG. 3(b), instead of the uniform reading, it is also possible to skip two lines or five lines alternately so that the R line (I) (or the R line (II)) can be read at the same time. Thus, all color information can be read in one driving operation.

A description will now be given of an example in which the image sensor is driven by reading the signals from ⅛ of the photoelectric elements 12 with reference to FIGS. 4(a) and 4(b).

Figures 4A, 4B:
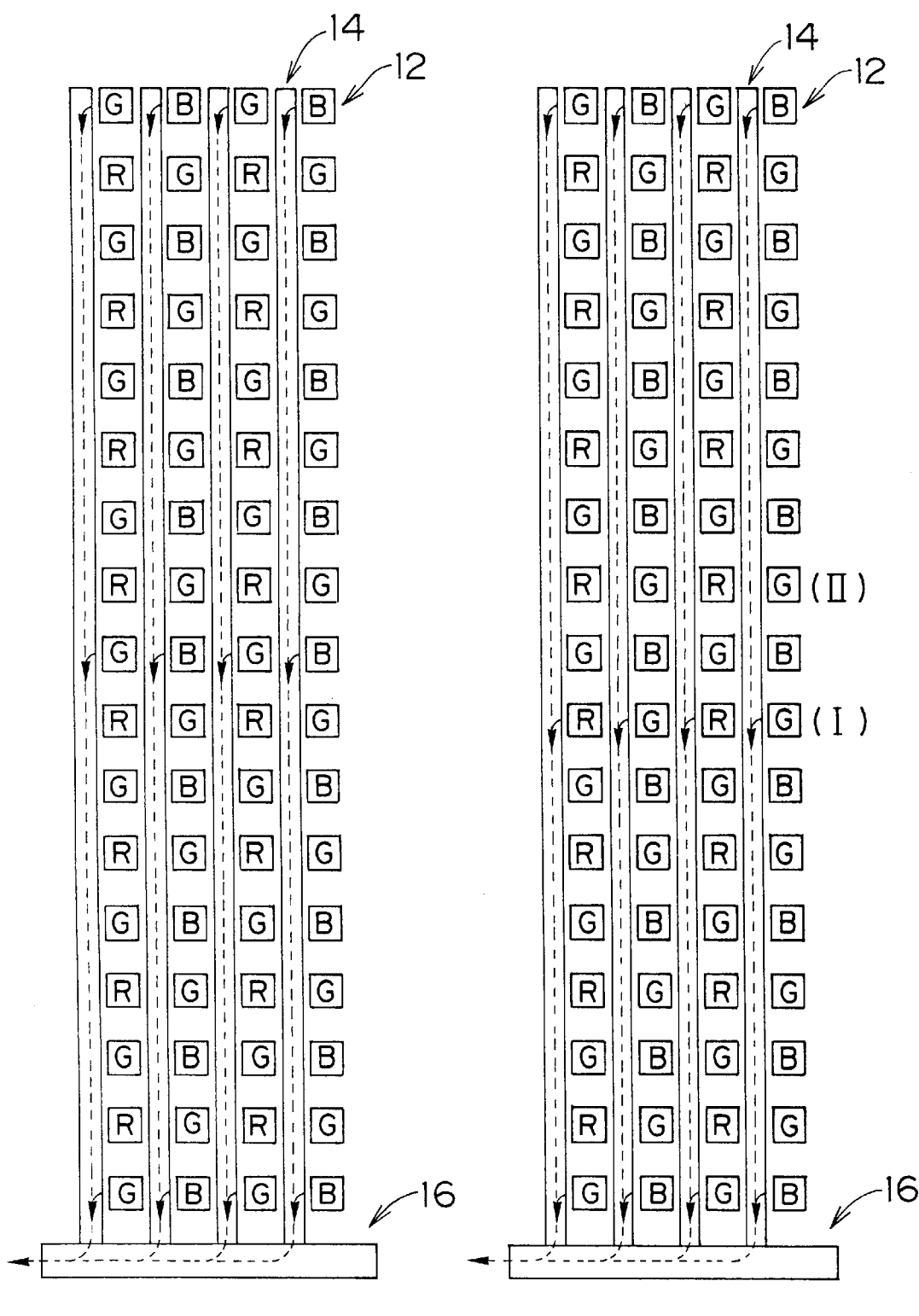
FIGS. 4(a) and 4(b) are explanation drawings showing examples wherein the image sensor is driven by reading the signal electric charges from ⅛ of the photoelectric elements.

FIG. 4(a) shows an example of the uniform reading, in which the signals are read from ⅛ of the photoelectric elements 12 at regular intervals in the vertical direction. One horizontal line is read, and then seven horizontal lines are skipped. Since it is impossible to obtain all color information in one driving operation, the R line is read in the next driving so that all color information can be read in the two driving operations.

As shown in FIG. 4(b), instead of the uniform reading, the number of lines to be skipped is changed to six or eight alternately so that the R line (I) (or the R line (II)) can be read. Thus, all color information can be read in one driving operation.

The above-described driving methods are not restricted to the CCD, but they may also be applied to drive other image sensors such as a metal oxide semiconductor (MOS) type imaging device and a charge injection device (CID).

The image sensor of the image-capturing apparatus is driven in the above-mentioned driving methods. A description will now be given about the combinations of the driving methods and image-capturing modes.

FIG. 5 is a block diagram showing an electronic camera according to an embodiment of the present invention. The electronic camera or a digital camera 20 comprises a taking lens 22, a diaphragm 24, a mechanical shutter 26, an image sensor or a solid-state imaging device 28, an analog signal processing part 30, an A/D converter 32, a digital signal processing part 34, a memory 36, a D/A converter 38, an image display or an LCD 40, a compression/expansion circuit 42, a memory card 44, a control circuit 46 and a central processing unit (CPU) 48. The control circuit 46 and the CPU 48 are equivalent to a drive controller.

The taking lens 22, which is simplified in the drawing, comprises one or more lenses. The taking lens 22 may be a fixed-focus lens or a variable focal-length lens such as a zoom lens and a step zoom lens. The focus and zoom of the taking lens 22 are controlled through the control circuit 46.

The diaphragm 24 is constructed in such a way that a plurality of holes with different diameters are formed in one diaphragm plate, for example. An electric driving means (not shown), which is controlled through the control circuit 46, changes the holes placed on the optical axis of the taking lens 22 by rotating the diaphragm plate. In FIG. 5, the diaphragm plate having two kinds of holes is shown, but it is also possible to use a fix diaphragm, a diaphragm capable of continuously changing the diameter of the hole, or a diaphragm capable of serving as the shutter.

The mechanical shutter 26 comprises a light-blocking plate, which is able to enter and exit an incident optical path of the solid-state imaging device 28. An electric driving means (not shown), which is controlled through the control circuit 46, blocks and opens the incident optical path of the solid-state imaging device 28 by driving the mechanical shutter 26.

The solid-state imaging device 28 is a known area image sensor (e.g., 1280×960 pixels). The solid-state imaging device 28 may be the CCD type, the MOS type, the CID type, or the like. In this embodiment, the CCD described in FIG. 1 is used as the solid-state imaging device 28. The solid-state imaging device 28 has a so-called electronic shutter function for controlling an accumulation time (a shutter speed), in which the electric charges are accumulated in each sensor by shutter gate pulses.

The diaphragm 24 and the mechanical shutter 26 regulate a light transmitted through the taking lens 22, and the light is projected on the solid-state imaging device 28. The electronic shutter controls the accumulation time at the solid-state imaging device 28. The diaphragm 24 may be fixed, or the mechanical shutter 26 may also be used as the diaphragm. If the image sensor is driven by reading all the photoelectric elements 12, the mechanical shutter 26 can be omitted.

An image of a subject is formed on a light receiving surface of the solid-state imaging device 28, and each of the photoelectric elements 12 converts the image into the signal electric charges corresponding to the quantity of incident light. The signal electric charges are sequentially read as image signals. Then, they are transmitted to the analog signal processing part 30.

The analog signal processing part, 30 includes a CDS cramp circuit and a gain adjustment circuit. The analog signal processing part 30 appropriately processes the image signals (analog electric signals), which are outputted from the solid-state imaging device 28, under the control of the control circuit 46. The A/D converter 32 converts the signals, which are outputted from the analog signal processing part 30, into digital signals, which are transmitted to the digital signal processing part 34.

The digital signal processing part 34 includes a gain control part, an AE integration circuit, a luminance (Y) signal generating circuit, a color differential (C) signal generating circuit and other signal processing circuits. The digital signal processing circuit 34 processes the data, which is outputted from the A/D converter 32. The image data outputted from the digital signal processing part 34 is temporarily stored in the memory 36.

The image data stored in the memory 36 is decoded and converted into analog signals by the D/A converter 38. Then, the analog signals are transmitted to the LCD 40. Consequently, an image captured by the solid-state imaging device 28 is displayed on the LCD 40. The LCD 40 displays a still image captured in response to the input of an image-recording start signal, which is generated by pressing a shutter release button (not shown), and an image before the input of the image-recording start signal (a moving image or an intermittent image). The image-recording start signal may be inputted from outside. The analog signals generated by the D/A converter 38 can be outputted as video output signals through an output means 41 such as a video output terminal. The digital image data read from the memory 36 may be outputted as digital output data through an output means such as a digital output terminal.

The image data, which is obtained in response to the input of the image-recording start signal, is compressed as the need arises to be recorded in the storage medium such as the, memory card 44. More specifically, the data inputted to the compression/expansion circuit 42 is compressed in a predetermined format (e.g., JPEG). Then, the compressed data is stored in the memory card 44. It is possible to select a compression rate of the image data among ¼, ⅛ and ⅟16 according to the image-capturing purposes. The storage medium may be a smart medium, an IC card, or the like.

The image data stored in the memory card 44 can be retrieved through the CPU 48, and the compression/expansion circuit 42 expands the read image data. The expanded image data is outputted to the LCD 40 through the memory 36 and the D/A converter 38. Of course, reproduced image signals or image data may be outputted to the external equipment through the output means 41 or the digital output terminal.

The CPU 48 is connected to the control circuit 46, the digital signal processing circuit 34, the memory 36, and so on, and the CPU 48 calculates an exposure, a focus position, etc. in accordance with a predetermined algorithm to supervise the AE, the AF, the automatic flashing, the automatic white balance, and so on. The CPU 48 also controls the circuits according to the signals inputted from the control part 50 including the shutter release button, a mode switcher or a macro key, and a mode setting dial.

For example, an AF unit calculates a focus evaluation value representing the sharpness of the subject image from the image signals, and calculates the focus position in accordance with the focus evaluation value. The AF unit controls the taking lens 22 through a focus driving circuit (not shown) to set the focus position. A known focusing means such as an AF sensor may also be used in the AF unit.

The control circuit 46 controls a drive circuit of the solid-state imaging device 28 in accordance with the exposure control value transmitted from the CPU 48, thereby setting the electric charge accumulation time in the solid-state imaging device 28, in other words, the electronic shutter value. The control circuit 46 also controls the setting of the diaphragm 24, the opening/closing timing of the mechanical shutter 26, and so on. Thus, the digital camera 20 automatically controls the exposure.

A description will now be given of a method for driving the image sensor in the digital camera, which is constructed in the above-mentioned manner.

First, a description will be given of the normal image-capturing mode. In the normal image-capturing mode, the digital camera 20 automatically controls the focus and the exposure (a combination of the shutter speed and the diaphragm value) according to the image-capturing conditions. In the normal image-capturing mode, the solid-state imaging device 28 is driven by reading the signals from ¼ or ⅛ of the photoelectric elements 12 as described with reference to FIGS. 3 or 4. In this case, although the obtained image is rough (if there are 960 pixels in a vertical direction, 240 pixels are read (in ¼) or 120 pixels are read (in ⅛)), a refresh rate, which is the number of times the images of one screen are refreshed in unit of time, can be high, and a picture composition can be confirmed satisfactorily to the extent that the image is displayed on the small LCD 40 attached to the digital camera 20.

Figure 6:
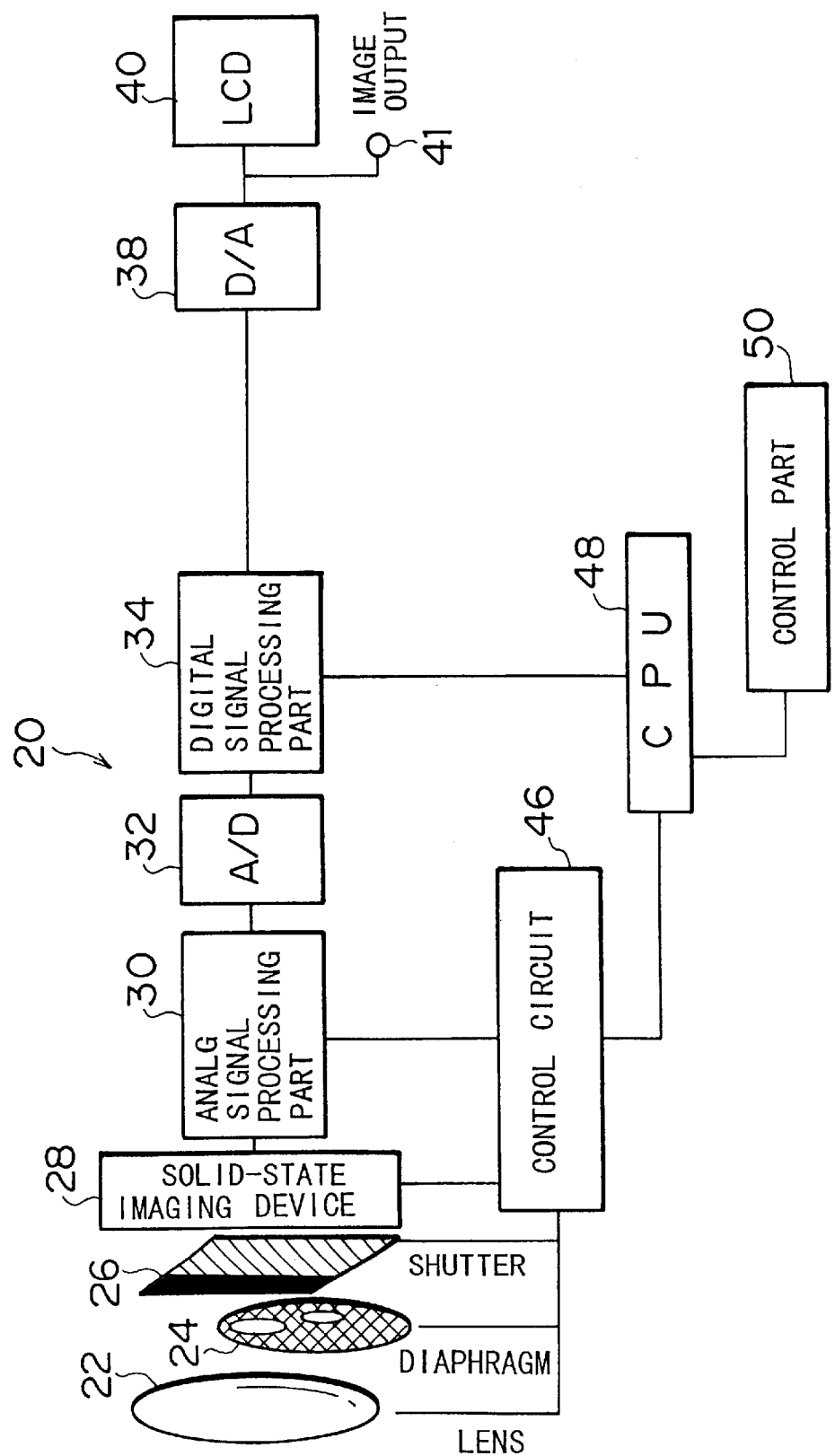
FIG. 6 is a block diagram of assistance in explaining the flow of signals in the case that a refresh rate of the image sensor is determined according to a format such as NTSC.

If the refresh rate is equal to the frame frequency of a color television signal format that is adopted for the display on the LCD 40, such as the National Television System Committee (NTSC), the Phase Alternation by Line (PAL) and the Sequential Color with Memory (SECAM), the power for the memory 36, etc. may be shut off since there is no need for temporally storing the image in the memory 36. Such a system, which is illustrated in FIG. 6, reduces the consumption of electricity.

Similarly, in the AE and the AF, the solid-state imaging device 28 is driven by reading ¼ or ⅛ of the photoelectric elements 12, or extracting a central ½ of the photoelectric elements 12. This enables the AE and the AF to be performed within a short time.

A description will be given of the macro (close range) image-capturing mode. Pressing the macro key of the control part 50 sets the camera to the macro image-capturing mode. A predetermined mark is displayed on the LCD 40 to indicate the macro image-capturing mode. The use of the macro image-capturing function enables close range shots between substantially 9 cm and substantially 50 cm. If the macro key is pressed again, the macro image-capturing mode is cancelled so that the camera can return to the normal image-capturing mode.

In the macro image-capturing mode, the solid-state imaging device 28 is driven by reading ½ of the photoelectric elements 12 or all the photoelectric elements 12 as described with reference to FIGS. 2 or 1. An interlace transfer driving type CCD, etc. read the signals in the above-described method. In the macro image-capturing, the focus should be more precise than in the normal image-capturing, and it is therefore preferable to obtain a precise image with many pixels in order to confirm the focused state. Therefore, in the macro image-capturing mode, the solid-state imaging device 28 is driven in such a way that the number of the photoelectric elements 12 to be read is increased automatically (½ of the photoelectric elements 12 in the vertical direction is read) or that all the photoelectric elements 12 are read. This obtains an image with a higher quality than in the normal image-capturing mode.

In the macro image-capturing mode, it is required sometimes that the central part of the screen should be enlarged for confirming the focus. To meet this requirement, it is possible to provide a confirmation control part such as a central part enlargement button. In order to realize such a central part enlarging function, the solid-state imaging device 28 is driven and the captured image is displayed on the LCD 40 as described below.

In the first method, the image sensor with many pixels (e.g., 1280×960 pixels) is driven in the normal driving (reading all the photoelectric elements), and only a central part 52A is extracted from an imaging area 52 and is displayed as shown in FIG. 7. If the image display such as the LCD 40 has approximately 320×240 pixels, the extracted image can be displayed at about 1:1 in pixel. Consequently, the focus, etc. can be confirmed precisely.

Figure 8:
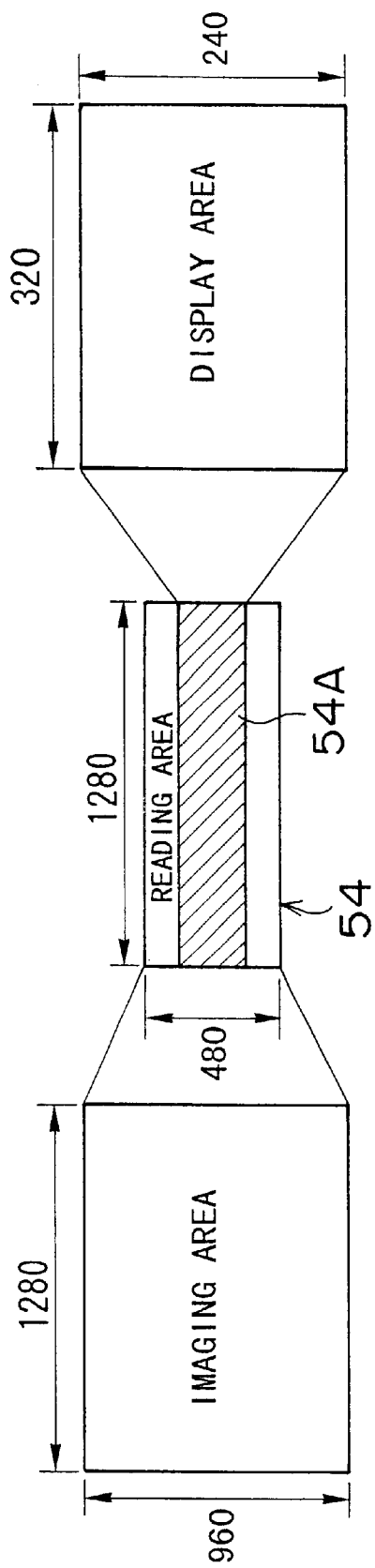
FIG. 8 is an explanation drawing showing another method of driving the image sensor and displaying the image on the monitor in the macro image-capturing mode.
Figure 9:
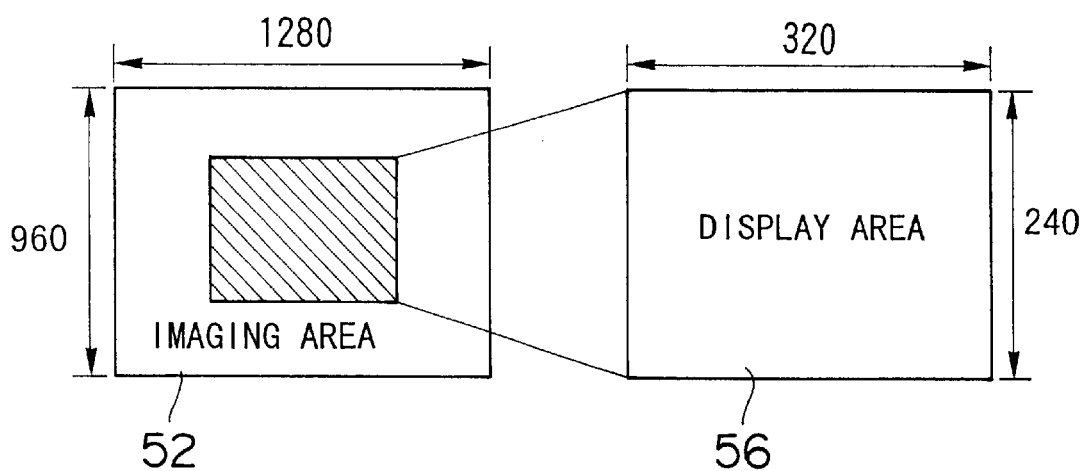
FIG. 9 is an explanation drawing showing a relation between an imaging area and a display area in the method of FIG. 8.
Figure 10:
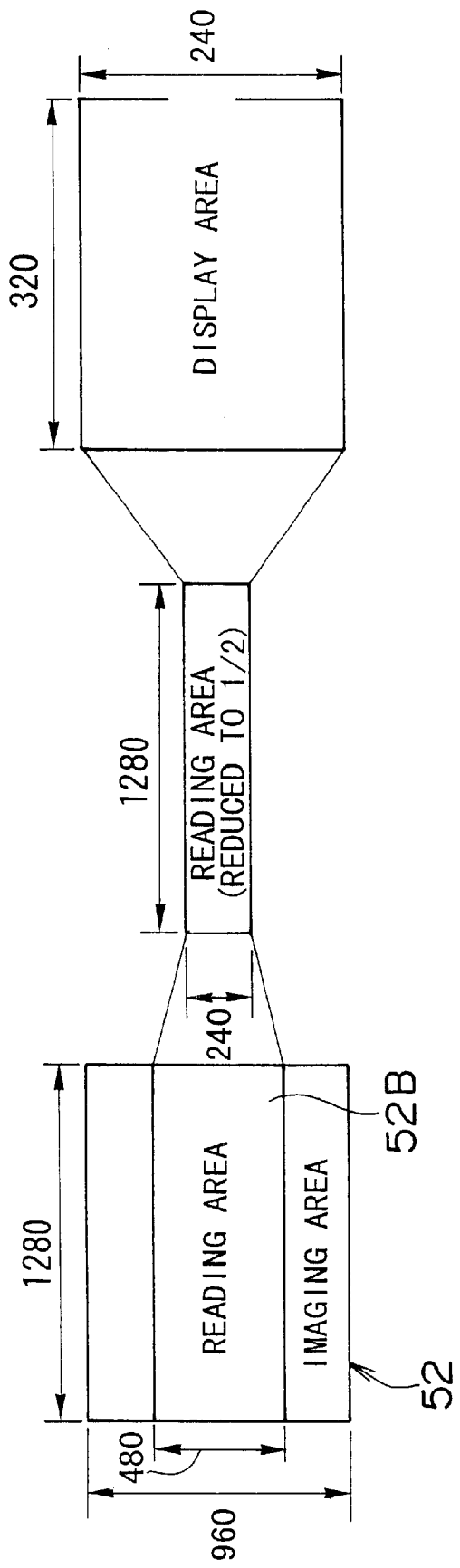
FIG. 10 is an explanation drawing showing another method of driving the image sensor and displaying the image on the monitor in the macro image-capturing mode.

In the second method, the image sensor with many pixels is driven by reading ½ of the photoelectric elements (1280× 480 pixels). Then, a vertically-central part 54A indicated by diagonal lines in FIG. 8 is extracted from a reading area 54, and then the number of pixels is reduced to half in the horizontal direction (i.e., 1280 to 640). Further, only the pixels at a central part are extracted so that the area of 320×240 pixels can be displayed. Consequently, the area of 320×240 pixels, which is equivalent to a display area 56, is extracted from the imaging area 52 and is displayed as shown in FIG. 9.

In the third method, only a vertically-central part 52B is read in the imaging area 52 of the image sensor with many pixels (e.g., 1280×960 pixels). Only the reading area 52B is driven by reading ½ of the photoelectric elements in the vertical directions. Then, the number of pixels is reduced to half in the horizontal direction (i.e., 1280 to 640), and further, only a central part with ½ of the pixels in the horizontal direction is extracted and displayed. In the third method, the display area 56 is extracted from the imaging area 52 in the same way as shown in FIG. 9.

A description will now be given of a method for driving the image sensor in an outside output mode.

The outside output mode is set when the video output terminal is connected to an external image display apparatus such as a monitor with a large-screen, or when the digital output terminal is connected to a personal computer, in short, when the image signal or data is outputted to external equipment. In the outside output mode, the image sensor is automatically driven by reading ½ of the photoelectric elements or all the photoelectric elements even in the normal image-capturing mode. Of course, the image sensor is driven by reading ½ of the photoelectric elements or all the photoelectric elements in the macro image-capturing mode.

More specifically, there is provided a detector for detecting the connection between the output terminal and the external equipment. When the detector detects the connection, a detection signal is transmitted to the CPU 48 so that the image sensor can be driven by reading ½ of the photoelectric elements or all the photoelectric elements automatically.

Alternatively, it is possible to provide a mode selector, which sets a mode for outputting the image signal or data to the external equipment. If the mode selector sets the outside output mode, the image sensor is driven automatically by reading ½ of the photoelectric elements or all the photoelectric elements.

In the outside output mode, the external equipment may be directly connected to the camera through a connector and a cable, or the data may be outputted from the camera to the external equipment by non-contact communication functions such as an infrared communication.

The camera is not necessarily connected to the large-screen monitor, but the screen of the external image display apparatus is usually larger than the screen of the LCD 40 attached to the digital camera 20. In such a case, a precise image can be displayed on the screen of the external image display apparatus.

As stated above, the digital camera 20 of this embodiment automatically changes the image sensor driving methods according to the modes and conditions of the camera such as the normal image-capturing mode, the macro image-capturing mode, the outside output mode, and the AE and AF.

Instead of, or in combination with automatically changing the image sensor driving methods, it is possible to provide a high-quality image confirmation mode for the user to freely select how to drive the image sensor. More specifically, if the high-quality image confirmation mode is selected, the image sensor is unconditionally driven by reading ½ of the photoelectric elements or all the photoelectric elements. The addition of the high-quality image confirmation mode makes it possible for the user to select a precise image with a low refresh rate or a rough image with a high refresh rate.

According to the digital camera 20 of this embodiment, the solid-state imaging device 28 with many pixels is driven by reading ¼ or ⅛ of the photoelectric elements in usual use and at the AE and the AF, so that the refresh rate can be high and only a small amount of electricity is consumed. When the captured image is confirmed in the macro image-capturing mode or when the captured image is outputted to the external equipment, the image is captured with less reduced (more number of) the photoelectric elements than the usual, or with all the photoelectric elements, to display a more precise image.

The image sensor driving method of the present invention may be applied not only to the digital camera but also to any electronic camera or an image-capturing apparatus, which obtains image signals electrically.

In the above-described embodiment, a first reading proportion is ¼ or ⅛, and second, third and fourth reading proportions are ½, but the reading proportions may be determined freely according to the number of the pixels in the image sensor.

As set forth hereinabove, according to the image sensor driving method and the electronic camera of the present invention, the image sensor is driven by reading a small number of pixels in usual use (in the normal image-capturing mode) and at the AE and the AF so that the images can be refreshed at a high refresh rate with a small amount of electricity although a relatively rough image is obtained. In the macro image-capturing mode and the outside output mode, the image sensor is driven by reading more pixels or all the pixels to thereby obtain a precise image although the refresh rate is low.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image sensor driving method for reading signals from photoelectric elements in an image sensor built in an image-capturing apparatus, the method comprising the steps of:
   reading signals from a first proportion of the photoelectric elements in the image sensor in a first mode in which a partial number of the total photoelectric elements are read; and
   reading signals from a second proportion of the photoelectric elements in the image sensor in a second mode in which a partial number of the total photoelectric elements which is greater than the partial number of the first proportion and up to all the photoelectric elements is read, the second mode capturing images in a range closer than a captured image of the fist mode.

2. The image sensor driving method as defined in claim 1, wherein:
   the first mode is a normal image-capturing mode; and
   the second mode is one of a macro image-capturing mode and a mode for outputting an image signal representing an image captured by the image sensor to external equipment.

3. The image sensor driving method as defined in claim 1, wherein a refresh rate of images captured by the image sensor in the first mode is equal to a frame frequency in a preset color television signal format.

4. The image sensor driving method as defined in claim 3, wherein the preset color television signal format is one of NTSC, PAL and SECAM.

5. An image sensor driving method for reading signals from photoelectric elements in an image sensor built in an image-capturing apparatus, the method comprising the steps of:
   reading signals from a first proportion of the photoelectric elements reduced in a vertical direction in the image sensor in a normal image-capturing mode; and
   reading signals from a second proportion of the photoelectric elements reduced in the vertical direction in the image sensor in at least one of a macro image-capturing mode and a mode by which images are captured at a range substantially closer than the normal image-capturing mode for outputting an image signal representing an image captured by the image sensor to external equipment, the second proportion being higher than the first proportion in read photoelectric elements and up to all photoelectric elements.

6. The image sensor driving method as defined in claim 5, wherein a refresh rate of images captured by the image sensor in the normal image-capturing mode is equal to a frame frequency in a preset color television signal format.

7. The image sensor driving method as defined in claim 6, wherein the preset color television signal format is one of NTSC, PAL and SECAM.

8. An electronic camera comprising:
   an image sensor for capturing an image, the image sensor including a plurality of photoelectric elements;
   an image display for displaying the image captured by the image sensor;
   a mode switcher for switching modes between a first mode and a second mode; and
   an image sensor drive controller for reading signals from a first proportion of the photoelectric elements from the total of photoelectric elements in the image sensor in the first mode, and reading signals from a second proportion of the photoelectric elements in the image sensor in the second mode, the second mode capturing images at a substantially closer range than the first mode the second proportion of photoelectric elements being higher than the first proportion and up to all photoelectric elements.

9. The electronic camera as defined in claim 8, wherein:
   the first mode is a normal image-capturing mode; and
   the second mode is one of a macro image-capturing mode and a mode for outputting an image signal representing the image captured by the image sensor to external equipment.

10. The electronic camera as defined in claim 8, further comprising:
    an output interface for outputting an image signal representing the image captured by the image sensor to external equipment; and
    wherein the image sensor drive controller reads signals from a third proportion of the photoelectric elements in the image sensor in a mode for outputting the image signal to the external equipment through the output interface, the third proportion being higher than the first proportion and up to all.

11. The electronic camera as defined in claim 8, further comprising:
    a high-quality image confirmation mode setting device for setting a high-quality image confirmation mode in response to an operation from outside; and
    wherein the image sensor drive controller reads signals from a third proportion of the photoelectric elements in the image sensor in the high-quality image confirmation mode, the third proportion being higher than the first proportion and up to all.

12. The electronic camera as defined in claim 8, wherein a refresh rate of images captured by the image sensor in the first mode is equal to a frame frequency in a preset color television signal format.

13. The electronic camera as defined in claim 12, wherein the preset color television signal format is one of NTSC, PAL and SECAM.

14. An electronic camera comprising:
    an image sensor for capturing an image, the image sensor including a plurality of photoelectric elements arranged two-dimensionally;
    an image display for displaying the image captured by the image sensor;
    a mode switcher for switching modes between a normal image-capturing mode and a macro image-capturing mode; and
    an image sensor drive controller for reading signals from a first proportion of the photoelectric elements in the image sensor in the normal image-capturing mode, and reading signals from a second proportion of the photoelectric elements in the image sensor in the macro image-capturing mode which captures images at a substantially closer range than the normal image-capturing mode, the second proportion of photoelectric elements being higher than the first proportion and up to all photoelectric elements.

15. The electronic camera as defined in claim 14, further comprising:
    an output interface for outputting an image signal representing the image captured by the image sensor to external equipment; and
    wherein the image sensor drive controller reads signals from a third proportion of the photoelectric elements in the image sensor in a mode for outputting the image signal to the external equipment through the output interface, the third proportion being higher than the first proportion and up to all.

16. The electronic camera as defined in claim 14, further comprising:
    a high-quality image confirmation mode setting device for setting a high-quality image confirmation mode in response to an operation from outside; and
    wherein the image sensor drive controller reads signals from a third proportion of the photoelectric elements in the image sensor in the high-quality image confirmation mode, the third proportion being higher than the first proportion and up to all.

17. The electronic camera as defined in claim 14, wherein a refresh rate of images captured by the image sensor in the normal image-capturing mode is equal to a frame frequency in a preset color television signal format.

18. The electronic camera as defined in claim 17, wherein the preset color television signal format is one of NTSC, PAL and SECAM.

* * * * *